US012682581B2

(12) United States Patent     (10) Patent No.:   US 12,682,581 B2
Murphy-Chutorian et al.     (45) Date of Patent:     Jul. 14, 2026

(54) GENERATING AND PRESENTING THIRD-PARTY AUGMENTED REALITY CONTENT

(71) Applicant: Niantic Spatial, Inc., San Francisco, CA (US)

(72) Inventors: Erik Marshall Murphy-Chutorian, Palo Alto, CA (US); Nicholas John Butko, Cupertino, CA (US); Rigel Gareth Benton, Mountain View, CA (US)

(73) Assignee: Niantic Spatial, Inc., San Francisco, CA (US)

( * ) Notice: Subject to any disclaimer, the term of this patent is extended or adjusted under 35 U.S.C. 154(b) by 215 days.

(21) Appl. No.: 18/240,689

(22) Filed: Aug. 31, 2023

(65) Prior Publication Data

US 2025/0078412 A1     Mar. 6, 2025

(51) Int. Cl.
    *G06T 19/00*        (2011.01)
    *G06T 13/40*        (2011.01)

(52) U.S. Cl.
    CPC ............ *G06T 19/006* (2013.01); *G06T 13/40* (2013.01)

(58) Field of Classification Search
None
See application file for complete search history.

(56) References Cited

U.S. PATENT DOCUMENTS

2017/0053447 A1*   2/2017   Chen ...................... G06T 17/20
2018/0264365 A1*   9/2018   Soederberg ........... A63F 13/655

OTHER PUBLICATIONS

Chen et al., "Multi-User Augmented Reality with Communication Efficient and Spatially Consistent Virtual Objects," 2020. (Year: 2020).*
8th WALL, "Introducing Lightship VPS for Web," Sep. 22, 2022, 10 pages, [Online] [Retrieved on Sep. 11, 2023], Retrieved from the internet <URL: https://www.8thwall.com/blog/post/85704231306/introducing-lightship-vps-for-web>.

* cited by examiner

*Primary Examiner* — Nicholas R Wilson
(74) *Attorney, Agent, or Firm* — Fenwick & West LLP

(57)        ABSTRACT

An online system generates and stores virtual models of physical spaces. These virtual models represent physical objects within the physical spaces through 3D representations of those objects. A content development system can request a virtual model associated with a physical space and modify the virtual model to include virtual objects. The content development system transmits the modified virtual model to be stored by the online system. A client device requests the modified virtual model from the online system when the client device is posed near the physical space. The client device uses the modified virtual model to display a modified video feed that displays the virtual content generated by the content development system as an augmented reality experience.

20 Claims, 6 Drawing Sheets

300

Client Device
310

| Camera Assembly 312 | Gaming Module 314 | Positioning Module 316 | Localization Module 318 |

Content Developer System 380

Network 370

Game Database 330

Game Server
320

| Universal Game Module 321 | Commercial Game Module 323 | Data Collection Module 324 |

| Event Module 326 | Mapping System 327 | 3D Map Store 329 |

GENERATING AND PRESENTING THIRD-PARTY AUGMENTED REALITY CONTENT

BACKGROUND

1. Technical Field

The subject matter described relates generally to augmented reality technologies, and, in particular, to presenting augmented reality content from a third-party to a user of an online system.

2. Problem

Online systems, such as game servers, provide augmented-reality experiences to users. In these experiences, virtual content is presented to the user along with the real world such that the virtual content appears to be within the real world. However, many online systems simply present the virtual content without the virtual content appearing to interact with the physical world. For example, a virtual character may appear to walk through the physical world at a certain distance away from the client device, but may be depicted on top of a tree that is closer to the client device than the virtual character is. Thus, augmented-reality experiences offered by many online systems appear unnatural to users and thereby offer a suboptimal experience.

Some online systems may generate virtual models of the physical world so that virtual objects can appear to interact with physical objects. For example, an online system may generate virtual models that includes 3D representations of physical objects within a physical space and may animate virtual objects such that the virtual objects, when rendered, appear to more realistically interact with the physical space. However, generating a virtual model of a physical space can be time and resource intensive. Thus, virtual models of physical spaces tend to be limited to sophisticated online systems with the resources to generate detailed virtual models or to niche projects for only a limited number of physical spaces.

Therefore, content developers who wish to generate realistic augmented reality content are stymied by the resources required to generate virtual models of physical spaces.

SUMMARY

The present disclosure describes an online system, such as a game server, that allows for third-party content developers to generate virtual content within virtual models made available by the online system. The online system stores a set of virtual models for a set of physical spaces. The virtual models include 3D representations (e.g., 3D meshes) that represent objects within the physical space, such as buildings or plants. Each virtual model also includes an origin point, which serves as a point of reference from which the 3D representations are located and oriented.

A content developer can generate custom virtual content for a physical space using one of the virtual models made available by the online system. For example, a system associated with the content developer may transmit a request for a virtual model to the online system. The online system transmits the virtual model to the content developer system, and the content developer system adds virtual objects to the virtual model. These virtual objects are positioned and oriented within the virtual model relative to the origin point of the virtual model. The content developer system transmits the modified virtual model to the online system, and the online system stores the modified virtual model in association with the physical space.

To display the virtual content for a physical space, a user's client device receives a virtual model that has been modified with virtual objects from a content developer system. The client device receives pose data describing the client device's pose and identifies its pose in the physical world based on the pose data. The client device identifies a virtual pose within the virtual model that corresponds to the identified physical pose. The client device may identify the virtual pose by comparing the 3D representations of physical objects to the physical objects detected in the pose data, or may identify the virtual pose based on a mapping of the origin point of the virtual model to a position in the physical world. The client device modifies a video feed from a camera of the client device to include the virtual objects based on the identified virtual pose. For example, the client device may render the virtual objects based on the client device's virtual pose and modify the video feed to include the rendered virtual objects. Generally, the client device does not render the 3D representations of physical objects in the physical space so that the virtual objects appear to be placed within and interact with the physical space. However, in some cases, the client device may render the 3D representations, e.g. to test how the virtual objects may appear to a user within the physical space.

By providing virtual models for third-party content development systems to use to generate custom virtual content, content developers can leverage the virtual models already developed by the online system to easily generate virtual content to be presented as an augmented reality experience at a remote physical location. Thus, content developers can use the online system as a platform for more easily generating augmented reality content.

DETAILED DESCRIPTION

The figures and the following description describe certain embodiments by way of illustration only. One skilled in the art will recognize from the following description that alternative embodiments of the structures and methods may be employed without departing from the principles described. Wherever practicable, similar or like reference numbers are used in the figures to indicate similar or like functionality.

Where elements share a common numeral followed by a different letter, this indicates the elements are similar or identical. A reference to the numeral alone generally refers to any one or any combination of such elements, unless the context indicates otherwise.

Various embodiments are described in the context of a parallel reality game that includes augmented reality content in a virtual world geography that parallels at least a portion of the real-world geography such that player movement and actions in the real-world affect actions in the virtual world. The subject matter described is applicable in other situations where presenting customized virtual content generated by third-party systems is desirable. In addition, the inherent flexibility of computer-based systems allows for a great variety of possible configurations, combinations, and divisions of tasks and functionality between and among the components of the system.

Example Location-Based Parallel Reality Game

Figure 1:
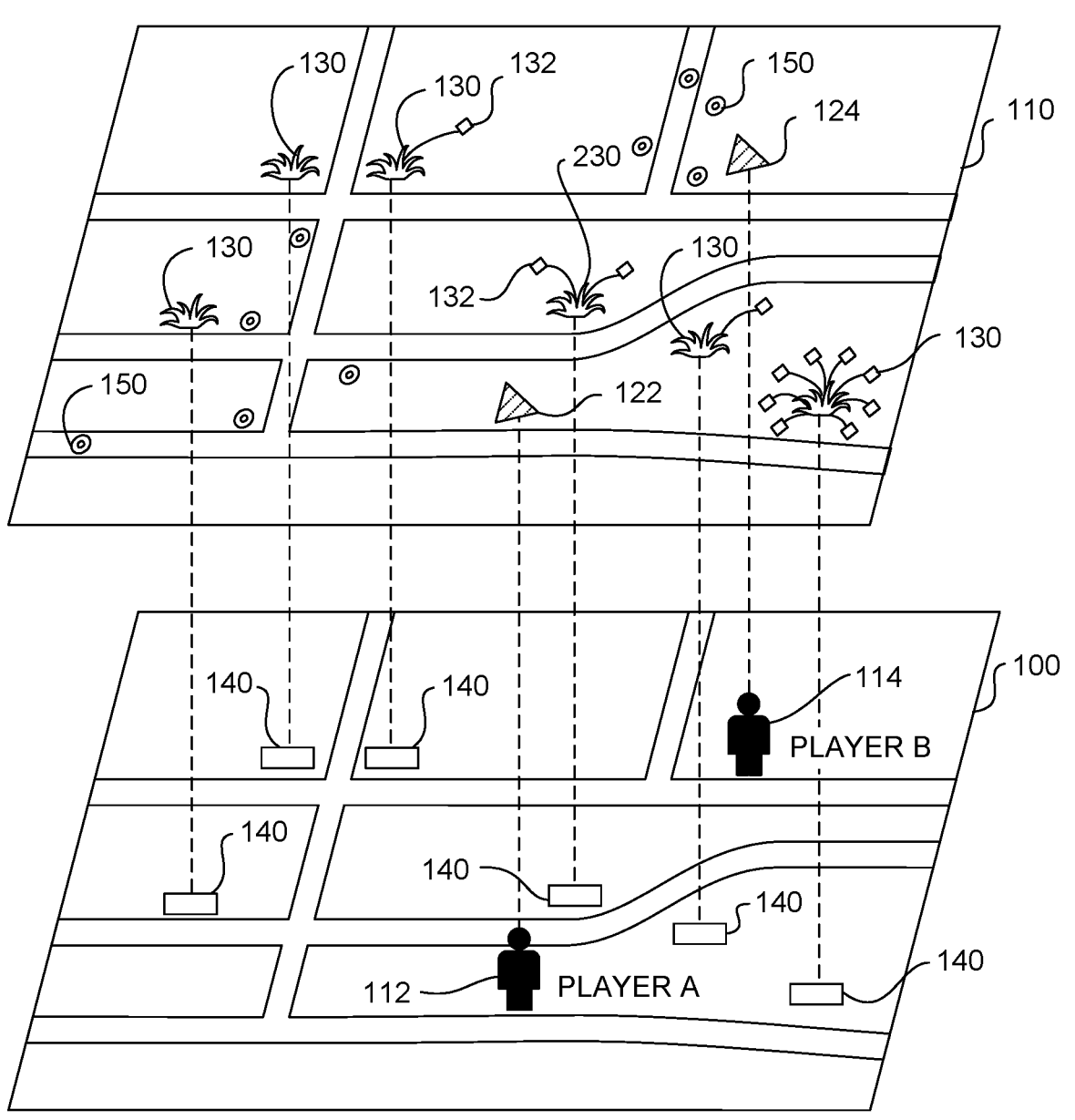
FIG. 1 depicts a representation of a virtual world having a geography that parallels the real world, according to one embodiment.

FIG. 1 is a conceptual diagram of a virtual world 110 that parallels the real world 100. The virtual world 110 can act as the game board for players of a parallel reality game. As illustrated, the virtual world 110 includes a geography that parallels the geography of the real world 100. In particular, a range of coordinates defining a geographic area or space in the real world 100 is mapped to a corresponding range of coordinates defining a virtual space in the virtual world 110. The range of coordinates in the real world 100 can be associated with a town, neighborhood, city, campus, locale, a country, continent, the entire globe, or other geographic area. Each geographic coordinate in the range of geographic coordinates is mapped to a corresponding coordinate in a virtual space in the virtual world 110.

A player's position in the virtual world 110 corresponds to the player's position in the real world 100. For instance, player A located at position 112 in the real world 100 has a corresponding position 122 in the virtual world 110. Similarly, player B located at position 114 in the real world 100 has a corresponding position 124 in the virtual world 110. As the players move about in a range of geographic coordinates in the real world 100, the players also move about in the range of coordinates defining the virtual space in the virtual world 110. In particular, a positioning system (e.g., a GPS system, a localization system, or both) associated with a mobile computing device carried by the player can be used to track a player's position as the player navigates the range of geographic coordinates in the real world 100. Data associated with the player's position in the real world 100 is used to update the player's position in the corresponding range of coordinates defining the virtual space in the virtual world 110. In this manner, players can navigate along a continuous track in the range of coordinates defining the virtual space in the virtual world 110 by simply traveling among the corresponding range of geographic coordinates in the real world 100 without having to check in or periodically update location information at specific discrete locations in the real world 100.

The location-based game can include game objectives requiring players to travel to or interact with various virtual elements or virtual objects scattered at various virtual locations in the virtual world 110. A player can travel to these virtual locations by traveling to the corresponding location of the virtual elements or objects in the real world 100. For instance, a positioning system can track the position of the player such that as the player navigates the real world 100, the player also navigates the parallel virtual world 110. The player can then interact with various virtual elements and objects at the specific location to achieve or perform one or more game objectives.

A game objective may have players interacting with virtual elements 130 located at various virtual locations in the virtual world 110. These virtual elements 130 can be linked to landmarks, geographic locations, or objects 140 in the real world 100. The real-world landmarks or objects 140 can be works of art, monuments, buildings, businesses, libraries, museums, or other suitable real-world landmarks or objects. Interactions include capturing, claiming ownership of, using some virtual item, spending some virtual currency, etc. To capture these virtual elements 130, a player travels to the landmark or geographic locations 140 linked to the virtual elements 130 in the real world and performs any necessary interactions (as defined by the game's rules) with the virtual elements 130 in the virtual world 110. For example, player A may have to travel to a landmark 140 in the real world 100 to interact with or capture a virtual element 130 linked with that particular landmark 140. The interaction with the virtual element 130 can require action in the real world, such as taking a photograph or verifying, obtaining, or capturing other information about the landmark or object 140 associated with the virtual element 130.

Game objectives may require that players use one or more virtual items that are collected by the players in the location-based game. For instance, the players may travel the virtual world 110 seeking virtual items 132 (e.g. weapons, creatures, power ups, or other items) that can be useful for completing game objectives. These virtual items 132 can be found or collected by traveling to different locations in the real world 100 or by completing various actions in either the virtual world 110 or the real world 100 (such as interacting with virtual elements 130, battling non-player characters or other players, or completing quests, etc.). In the example shown in FIG. 1, a player uses virtual items 132 to capture one or more virtual elements 130. In particular, a player can deploy virtual items 132 at locations in the virtual world 110 near to or within the virtual elements 130. Deploying one or more virtual items 132 in this manner can result in the capture of the virtual element 130 for the player or for the team/faction of the player.

In one particular implementation, a player may have to gather virtual energy as part of the parallel reality game. Virtual energy 150 can be scattered at different locations in the virtual world 110. A player can collect the virtual energy 150 by traveling to (or within a threshold distance of) the location in the real world 100 that corresponds to the location of the virtual energy in the virtual world 110. The virtual energy 150 can be used to power virtual items or perform various game objectives in the game. A player that loses all virtual energy 150 may be disconnected from the game or prevented from playing for a certain amount of time or until they have collected additional virtual energy 150.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing their locations.

Figure 2:
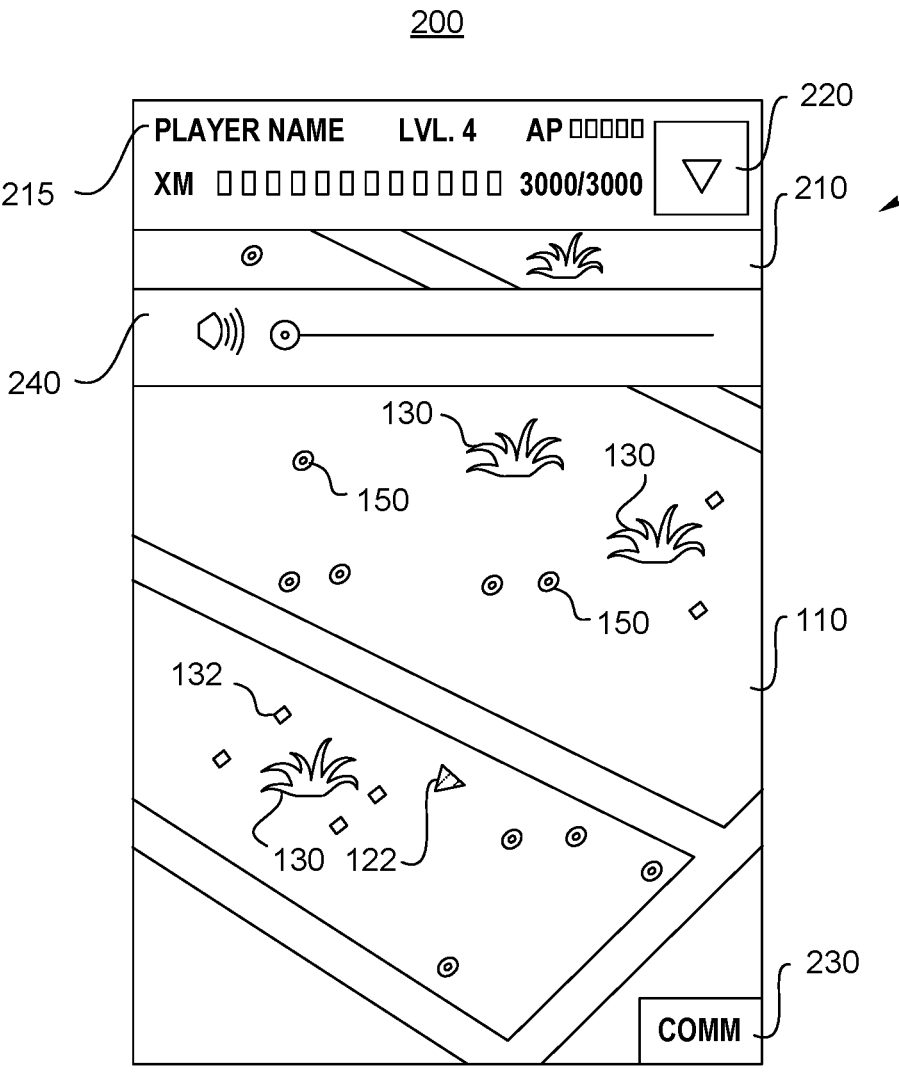
FIG. 2 depicts an exemplary game interface of a parallel reality game, according to one embodiment.

FIG. 2 depicts one embodiment of a game interface 200 that can be presented (e.g., on a player's smartphone) as part of the interface between the player and the virtual world 110. The game interface 200 includes a display window 210 that can be used to display the virtual world 110 and various other aspects of the game, such as player position 122 and the locations of virtual elements 130, virtual items 132, and virtual energy 150 in the virtual world 110. The user interface 200 can also display other information, such as game data information, game communications, player information, client location verification instructions and other information associated with the game. For example, the user interface can display player information 215, such as player name, experience level, and other information. The user interface 200 can include a menu 220 for accessing various game settings and other information associated with the game. The user interface 200 can also include a communications interface 230 that enables communications between the game system and the player and between one or more players of the parallel reality game.

According to aspects of the present disclosure, a player can interact with the parallel reality game by carrying a client device around in the real world. For instance, a player can play the game by accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 200 can include non-visual elements that allow a user to interact with the game. For instance, the game interface can provide audible notifications to the player when the player is approaching a virtual element or object in the game or when an important event happens in the parallel reality game. In some embodiments, a player can control these audible notifications with audio control 240. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. Players may also be able to obtain enhanced "powers" or virtual items that can be used to complete game objectives within the game.

Those of ordinary skill in the art, using the disclosures provided, will appreciate that numerous game interface configurations and underlying functionalities are possible. The present disclosure is not intended to be limited to any one particular configuration unless it is explicitly stated to the contrary.

Example Gaming System

Figure 3:
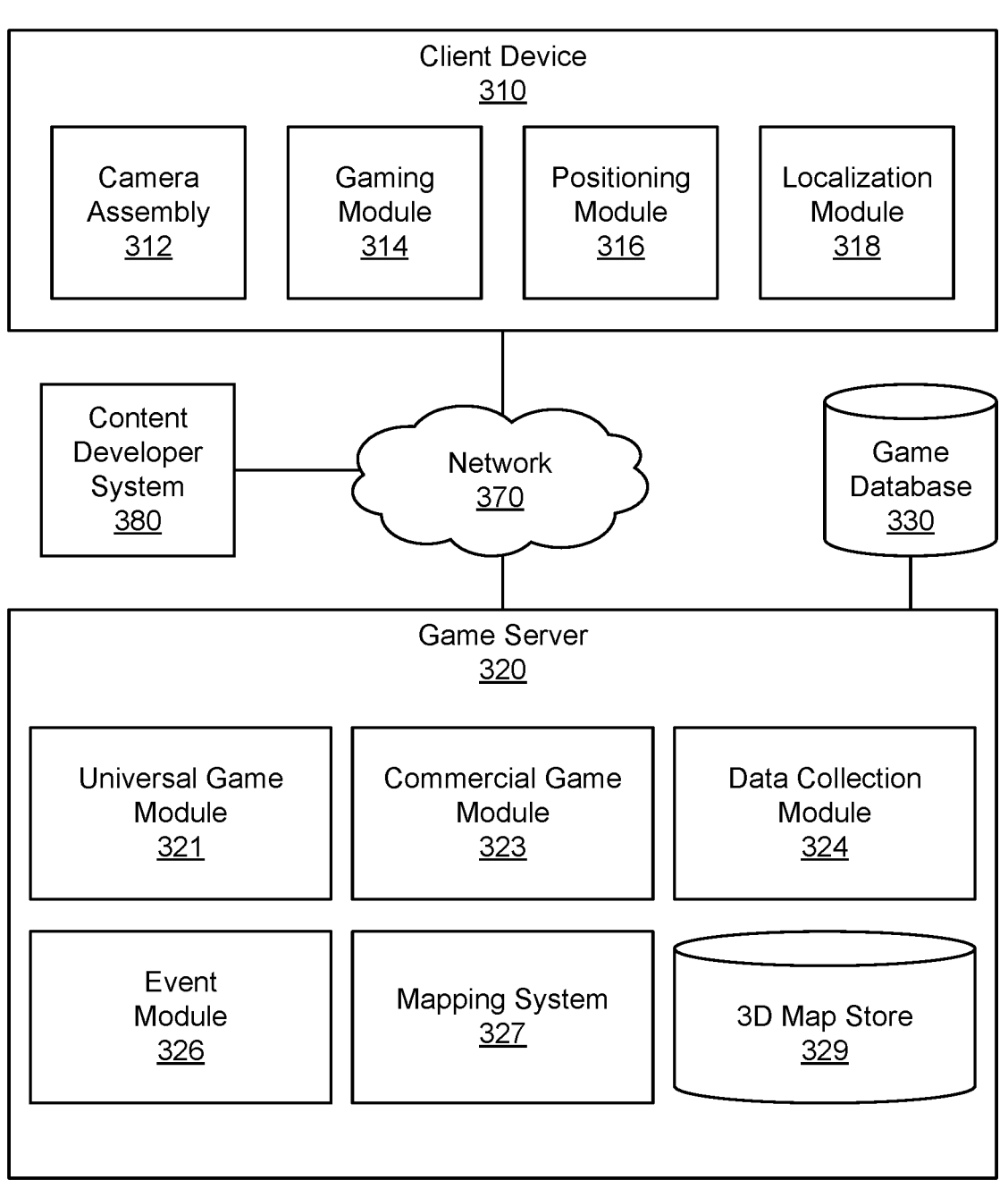
FIG. 3 is a block diagram of a networked computing environment suitable for third-party generation of virtual content, according to one embodiment.

FIG. 3 illustrates one embodiment of a networked computing environment 300. The networked computing environment 300 uses a client-server architecture, where a game server 320 communicates with a client device 310 over a network 370 to provide a parallel reality game to a player at the client device 310. The networked computing environment 300 also may include other external systems such as sponsor/advertiser systems or business systems. Although only one client device 310 is shown in FIG. 3, any number of client devices 310 or other external systems may be connected to the game server 320 over the network 370. Furthermore, the networked computing environment 300 may contain different or additional elements and functionality may be distributed between the client device 310 and the server 320 in different manners than described below.

The networked computing environment 300 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 310 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 310.

A client device 310 can be any portable computing device capable for use by a player to interface with the game server 320. For instance, a client device 310 is preferably a portable wireless device that can be carried by a player, such as a smartphone, portable gaming device, augmented reality (AR) headset, cellular phone, tablet, personal digital assistant (PDA), navigation system, handheld GPS system, or other such device. For some use cases, the client device 310 may be a less-mobile device such as a desktop or a laptop computer. Furthermore, the client device 310 may be a vehicle with a built-in computing device.

The client device 310 communicates with the game server 320 to provide sensory data of a physical environment. In one embodiment, the client device 310 includes a camera assembly 312, a gaming module 314, positioning module 316, and localization module 318. The client device 310 also includes a network interface (not shown) for providing communications over the network 370. In various embodiments, the client device 310 may include different or additional components, such as additional sensors, display, and software modules, etc.

The camera assembly 312 includes one or more cameras which can capture image data. The cameras capture image data describing a scene of the environment surrounding the client device 310 with a particular pose (the location and orientation of the camera within the environment). The camera assembly 312 may use a variety of photo sensors with varying color capture ranges and varying capture rates. Similarly, the camera assembly 312 may include cameras with a range of different lenses, such as a wide-angle lens or a telephoto lens. The camera assembly 312 may be configured to capture single images or multiple images as frames of a video.

The client device 310 may also include additional sensors for collecting data regarding the environment surrounding the client device, such as movement sensors, accelerometers, gyroscopes, barometers, thermometers, light sensors, microphones, etc. The image data captured by the camera assembly 312 can be appended with metadata describing other information about the image data, such as additional sensory data (e.g. temperature, brightness of environment, air pressure, location, pose etc.) or capture data (e.g. exposure length, shutter speed, focal length, capture time, etc.).

The gaming module 314 provides a player with an interface to participate in the parallel reality game. The game server 320 transmits game data over the network 370 to the client device 310 for use by the gaming module 314 to provide a local version of the game to a player at locations remote from the game server. In one embodiment, the gaming module 314 presents a user interface on a display of the client device 310 that depicts a virtual world (e.g. renders imagery of the virtual world) and allows a user to interact with the virtual world to perform various game objectives. In some embodiments, the gaming module 314 presents images of the real world (e.g., captured by the camera assembly 312) augmented with virtual elements from the parallel reality game. In these embodiments, the gaming module 314 may generate or adjust virtual content according to other information received from other components of the client device 310. For example, the gaming module 314 may adjust a virtual object to be displayed on the user interface according to a depth map of the scene captured in the image data.

The gaming module 314 can also control various other outputs to allow a player to interact with the game without requiring the player to view a display screen. For instance, the gaming module 314 can control various audio, vibratory, or other notifications that allow the player to play the game without looking at the display screen.

The positioning module 316 can be any device or circuitry for determining the position of the client device 310. For example, the positioning module 316 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, IP address analysis, triangulation and/or proximity to cellular towers or Wi-Fi hotspots, or other suitable techniques.

As the player moves around with the client device 310 in the real world, the positioning module 316 tracks the position of the player and provides the player position information to the gaming module 314. The gaming module 314 updates the player position in the virtual world associated with the game based on the actual position of the player in the real world. Thus, a player can interact with the virtual world simply by carrying or transporting the client device 310 in the real world. In particular, the location of the player in the virtual world can correspond to the location of the player in the real world. The gaming module 314 can provide player position information to the game server 320 over the network 370. In response, the game server 320 may enact various techniques to verify the location of the client device 310 to prevent cheaters from spoofing their locations. It should be understood that location information associated with a player is utilized only if permission is granted after the player has been notified that location information of the player is to be accessed and how the location information is to be utilized in the context of the game (e.g. to update player position in the virtual world). In addition, any location information associated with players is stored and maintained in a manner to protect player privacy.

The localization module 318 provides an additional or alternative way to determine the location of the client device 310. In one embodiment, the localization module 318 receives the location determined for the client device 310 by the positioning module 316 and refines it by determining a pose of one or more cameras of the camera assembly 312. The localization module 318 may use the location generated by the positioning module 316 to select a 3D map of the environment surrounding the client device 310 and localize against the 3D map. The localization module 318 may obtain the 3D map from local storage or from the game server 320. The 3D map may be a point cloud, mesh, or any other suitable 3D representation of the environment surrounding the client device 310. Alternatively, the localization module 318 may determine a location or pose of the client device 310 without reference to a coarse location (such as one provided by a GPS system), such as by determining the relative location of the client device 310 to another device.

In one embodiment, the localization module 318 applies a trained model to determine the pose of images captured by the camera assembly 312 relative to the 3D map. Thus, the localization model can determine an accurate (e.g., to within a few centimeters and degrees) determination of the position and orientation of the client device 310. The position of the client device 310 can then be tracked over time using dead reckoning based on sensor readings, periodic re-localization, or a combination of both. Having an accurate pose for the client device 310 may enable the gaming module 314 to present virtual content overlaid on images of the real world (e.g., by displaying virtual elements in conjunction with a real-time feed from the camera assembly 312 on a display) or the real world itself (e.g., by displaying virtual elements on a transparent display of an AR headset) in a manner that gives the impression that the virtual objects are interacting with the real world. For example, a virtual character may hide behind a real tree, a virtual hat may be placed on a real statue, or a virtual creature may run and hide if a real person approaches it too quickly.

The game server 320 includes one or more computing devices that provide game functionality to the client device 310. The game server 320 can include or be in communication with a game database 330. The game database 330 stores game data used in the parallel reality game to be served or provided to the client device 310 over the network 370.

The game data stored in the game database 330 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); or (8) any other data used, related to, or obtained during implementation of the parallel reality game. The game data stored in the game database 330 can be populated either offline or in real time by system administrators or by data received from users (e.g., players), such as from a client device 310 over the network 370.

In one embodiment, the game server 320 is configured to receive requests for game data from a client device 310 (for instance via remote procedure calls (RPCs)) and to respond to those requests via the network 370. The game server 320 can encode game data in one or more data files and provide the data files to the client device 310. In addition, the game server 320 can be configured to receive game data (e.g. player positions, player actions, player input, etc.) from a client device 310 via the network 370. The client device 310 can be configured to periodically send player input and other updates to the game server 320, which the game server uses to update game data in the game database 330 to reflect any and all changed conditions for the game.

In the embodiment shown in FIG. 3, the game server 320 includes a universal game module 322, a commercial game module 323, a data collection module 324, an event module 326, a mapping system 327, and a 3D map store 329. As mentioned above, the game server 320 interacts with a game database 330 that may be part of the game server or accessed remotely (e.g., the game database 330 may be a distributed database accessed via the network 370). In other embodiments, the game server 320 contains different or additional elements. In addition, the functions may be distributed among the elements in a different manner than described.

The universal game module 322 hosts an instance of the parallel reality game for a set of players (e.g., all players of the parallel reality game) and acts as the authoritative source for the current status of the parallel reality game for the set of players. As the host, the universal game module 322 generates game content for presentation to players (e.g., via their respective client devices 310). The universal game module 322 may access the game database 330 to retrieve or store game data when hosting the parallel reality game. The universal game module 322 may also receive game data from client devices 310 (e.g. depth information, player input, player position, player actions, landmark information, etc.) and incorporates the game data received into the overall parallel reality game for the entire set of players of the parallel reality game. The universal game module 322 can also manage the delivery of game data to the client device 310 over the network 370. In some embodiments, the universal game module 322 also governs security aspects of the interaction of the client device 310 with the parallel reality game, such as securing connections between the client device and the game server 320, establishing connections between various client devices, or verifying the location of the various client devices 310 to prevent players cheating by spoofing their location.

The universal game module 321 may generate and store virtual models of physical spaces. The universal game module 321 may generate the virtual models based on sensor data or images collected from client devices 310, and may use these virtual models to provide a virtual or augmented reality experience to a user. In some cases, the universal game module 321 provides virtual models to third-party systems for the third-party systems to generate custom virtual content for the virtual models. The generation of virtual models and the modification of the virtual models by third-party systems is discussed in further detail below.

The commercial game module 323 can be separate from or a part of the universal game module 322. The commercial game module 323 can manage the inclusion of various game features within the parallel reality game that are linked with a commercial activity in the real world. For instance, the commercial game module 323 can receive requests from external systems such as sponsors/advertisers, businesses, or other entities over the network 370 to include game features linked with commercial activity in the real world. The commercial game module 323 can then arrange for the inclusion of these game features in the parallel reality game on confirming the linked commercial activity has occurred. For example, if a business pays the provider of the parallel reality game an agreed upon amount, a virtual object identifying the business may appear in the parallel reality game at a virtual location corresponding to a real-world location of the business (e.g., a store or restaurant).

The data collection module 324 can be separate from or a part of the universal game module 322. The data collection module 324 can manage the inclusion of various game features within the parallel reality game that are linked with a data collection activity in the real world. For instance, the data collection module 324 can modify game data stored in the game database 330 to include game features linked with data collection activity in the parallel reality game. The data collection module 324 can also analyze data collected by players pursuant to the data collection activity and provide the data for access by various platforms.

The event module 326 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The mapping system 327 generates a 3D map of a geographical region based on a set of images. The 3D map may be a point cloud, polygon mesh, or any other suitable representation of the 3D geometry of the geographical region. The 3D map may include semantic labels providing additional contextual information, such as identifying objects tables, chairs, clocks, lampposts, trees, etc.), materials (concrete, water, brick, grass, etc.), or game properties (e.g., traversable by characters, suitable for certain in-game actions, etc.). In one embodiment, the mapping system 327 stores the 3D map along with any semantic/contextual information in the 3D map store 329. The 3D map may be stored in the 3D map store 329 in conjunction with location information (e.g., GPS coordinates of the center of the 3D map, a ringfence defining the extent of the 3D map, or the like). Thus, the game server 320 can provide the 3D map to client devices 310 that provide location data indicating they are within or near the geographic area covered by the 3D map.

The network 370 can be any type of communications network, such as a local area network (e.g. intranet), wide area network (e.g. Internet), or some combination thereof. The network can also include a direct connection between a client device 310 and the game server 320. In general, communication between the game server 320 and a client device 310 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

The content developer system 380 is a third-party system that generates custom virtual content to be presented to users through the client device. The content developer system 380 requests virtual models of physical spaces from the game server 320 and adds custom virtual content to those virtual models. The content developer system 380 and its interactions with the game server is described in further detail below. In some embodiments, the content developer system 380 is integrated into the game server 320 and may be accessed by developers locally or remotely (e.g., via a web interface over the network 370).

This disclosure makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes disclosed as being implemented by a server may be implemented using a single server or multiple servers working in combination. Databases and applications may be implemented on a single system or distributed across multiple systems. Distributed components may operate sequentially or in parallel.

In situations in which the systems and methods disclosed access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Figure 4:
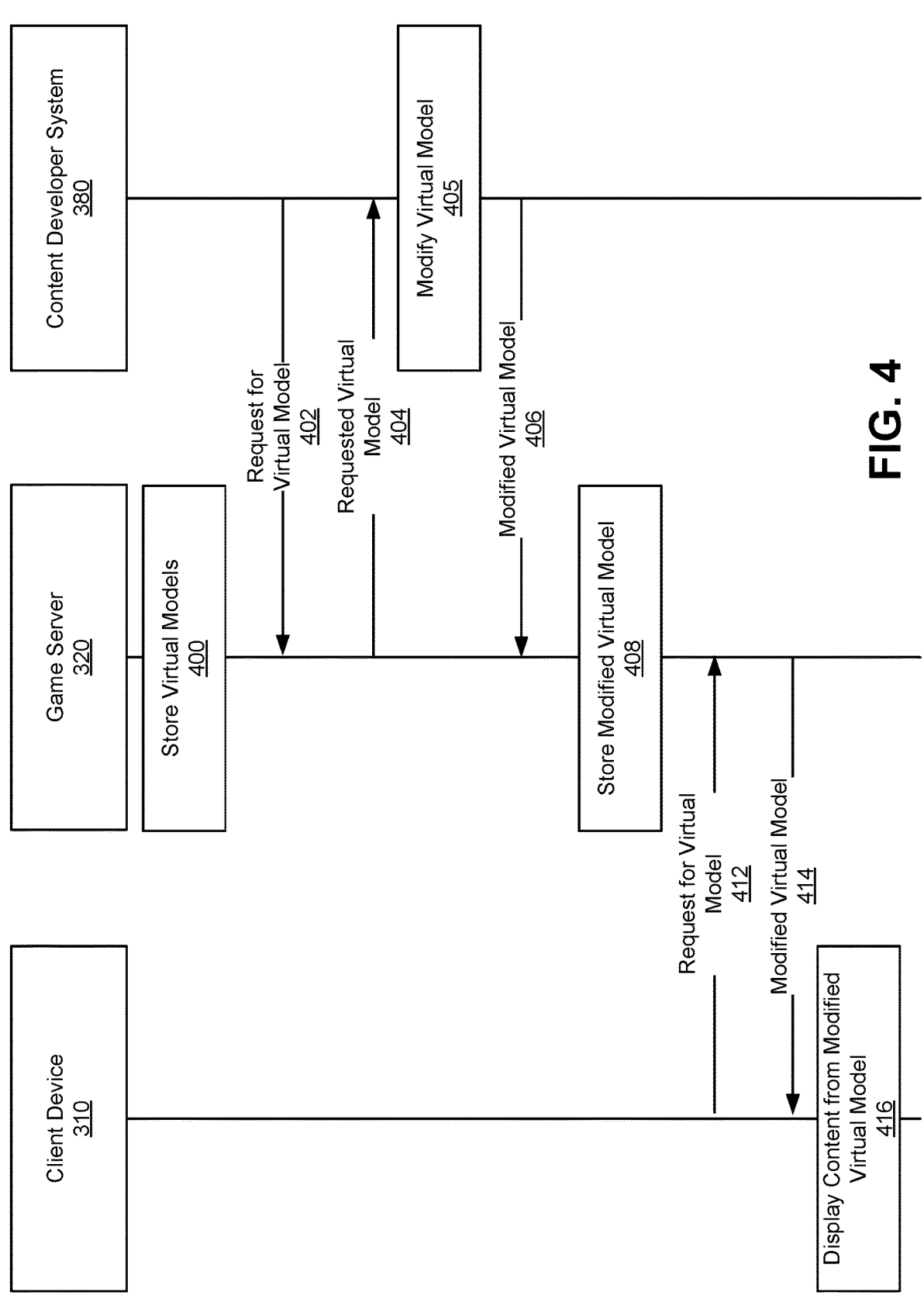
FIG. 4 is an interaction diagram illustrating interactions between a client device, a game server, and a content developer system to generate and display custom virtual content, according to one embodiment.

Example Methods for Generating and Presenting Virtual Content from a Content Development System as an Augmented Reality Experience FIG. 4 is an interaction diagram illustrating interactions between a client device, a game server, and a content developer system to generate and display custom virtual content, in accordance with some embodiments. Alternative embodiments may include more, fewer, or different steps and interactions, and the illustrated steps and interactions may be performed by or between different systems or in a different order from that illustrated in FIG. 4.

A game server stores 400 virtual models that represent physical spaces within the physical world. Each virtual model has a 3D representation of physical objects (e.g., plants and buildings) within the physical space. For example, the virtual model may include a 3D mesh of polygons for each of a set of physical objects within the physical space. Each virtual model also includes a corresponding origin point. An origin point is a point of reference from which virtual objects within the virtual model are located and oriented using a coordinate system. For example, the locations of virtual objects may be quantified as locations relative to the origin point of the virtual model. The origin point may also include a baseline for orientation within the virtual model and virtual objects are oriented relative to that baseline orientation. In some embodiments, the origin point is a six-dimensional point, with three dimensions for location and three dimensions for orientation.

The game server may generate virtual models for physical spaces that correspond to real-world landmarks, such as buildings, signs, parking areas, or parks. For example, the game server may generate virtual models for a physical space surrounding some physical location corresponding to a landmark. The game server also may generate a virtual model for a physical space based on a larger model of a larger physical area. For example, the game server may store a large virtual model for a larger area, such as city or a neighborhood, and may generate sub models for physical spaces within that larger area.

In some embodiments, the game server generates virtual models of physical spaces based on crowd-sourced data collected from multiple client devices that pass through the physical spaces. As users use a client application on a client device, the client device may collect data describing the environment around the client device, such as images or sensor data. The client devices transmit the collected data to the game server with pose data indicating the pose of the client devices. The game server uses the collected sensor data and the pose data to generate the virtual models for the physical spaces.

A content developer system transmits a request 402 for a virtual model to the game server. The request may include an identifier for a virtual model stored by the game server. The request also may include a physical space to which the virtual model corresponds. In some embodiments, the game server stores multiple virtual models for each of a set of physical spaces. In these embodiments, the request 402 may include an identifier for which of a set of virtual models for a physical space the content developer system is requesting. The game server accesses the virtual model requested by the content develop system and transmits the requested virtual model 404 to the content developer system.

The content developer system modifies 405 the virtual model to include custom virtual content to be displayed to a user. This custom virtual content is content to be presented to a user through a client device as part of an augmented reality experience. The custom virtual content includes one or more virtual objects that the content developer system has added to the virtual model. These virtual objects are located and oriented relative to the origin point of the virtual model. In some embodiments, the virtual objects include animation instructions that detail how a virtual object should move, change, or appear to interact with the physical space represented by the virtual model. For example, if the physical space includes a tree, the content developer system may add a virtual object for a monkey and include animation instructions that cause the monkey to appear to be hanging from a branch of the tree.

The content developer system transmits the modified virtual model 406 to the game server and the game server stores 408 the modified virtual model. The game server may store the modified virtual model in association with the physical space that the model represents.

A client device transmits a request 412 for a virtual model to the game server. The request 412 may include an identifier for a modified virtual model and the game server transmits the modified virtual model 414 to the client device. Alternatively, the request 412 may indicate a pose of the client device and the game server may use the client device's pose to identify the modified virtual model as a virtual model for a physical space near the client device.

Figure 5:
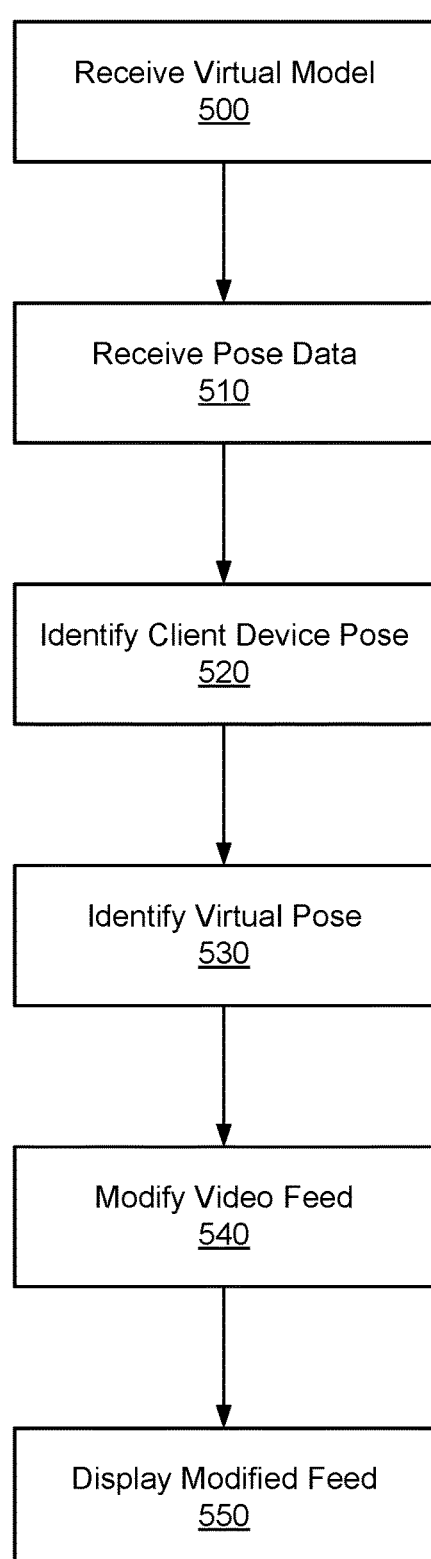
FIG. 5 is a flowchart for an example method by which a client device displays custom content within a virtual model, according to one embodiment.

The client device displays 416 the custom content generated by the content developer system from the modified virtual model. FIG. 5 is a flowchart for an example method by which a client device displays custom content within a virtual model, in accordance with some embodiments. Alternative embodiments may include more, fewer, or different steps from those illustrated in FIG. 5 and the steps may be performed in a different order from that illustrated in FIG. 5. Furthermore, while the steps may be performed entirely by the client device, some or all of the steps may be performed by the game server.

As noted above, the client device receives 500 a virtual model from the game server. The client device also receives 510 pose data describing the pose of the client device. The pose data may include sensor data from one or more sensors of the client device (e.g., GPS or IMU data) that describes the client device's location and orientation. The pose data may further include images or a video feed from a camera of the client device. In some embodiments, the pose data describes the location of physical objects in an area around the client device. For example, the pose data may include images that depict objects near the client device or may include LIDAR data that measures the distances of objects from the client device.

The client device identifies 520 a pose for the client device in the real world based on the pose data. The identified pose for the client device may be within or near the physical space represented by the received virtual model. As noted above, in alternative embodiments, the client device transmits the pose data to the game server and receives the identified pose from the game server.

The client device identifies 530 a virtual pose within the received virtual model that corresponds to the identified pose of the client device in the real world. The virtual pose is located and oriented within the virtual model relative to the origin point of the virtual model. To identify the virtual pose, the client device may use the received pose data to identify physical objects near the client device. The client device may compare the identified physical objects to the 3D representations of the physical objects stored in the virtual model to determine which of the 3D representations correspond to which physical objects as described by the pose data. The client device may thereby identify its virtual pose within the virtual model.

Alternatively, the client device may use a mapping of physical poses to virtual poses to identify its virtual pose. For example, the game server may store a physical pose in the real world that corresponds to the origin point of the virtual model. The client device may use this mapping of the virtual model's origin point to the real world to transform its own physical pose from the physical world to a virtual pose in the virtual model.

The client device modifies 540 a video feed from the camera of the client device based on the client device's virtual pose and the virtual objects of the custom content in the virtual model. For example, the client device may render the virtual objects based on whether the virtual objects are within a virtual field of view of the client device within the virtual model. If the virtual objects are within the virtual field of view of the client device, the client device renders the virtual objects from the perspective of the client device's virtual pose within the virtual model. The client device modifies the video feed from the camera to include the rendered virtual objects such that the rendered virtual objects appear as if they were part of the original video feed.

The client device displays 550 the modified video feed to the user through a display of the client device. The client device may also allow the user to interact with the virtual objects through a user interface on the client device or by tracking the user's movements and detecting when the user has "touched" a virtual object. The client device may update animations related to the virtual objects based on the user's interactions.

The client device generally does not render the 3D representations of physical objects in the virtual model. Because the virtual objects are rendered from the perspective of the client device's virtual pose within the virtual mode, the virtual objects appear to interact with the actual physical objects in the video feed when the video feed is modified to include the virtual objects. However, in some cases, the client device may render the 3D representations of physical objects as well. For example, a content developer associated with the content developer system may want to test how the virtual objects would appear within the physical space without visiting the physical space. To test the virtual objects, a user of a client device may select an option for the 3D representations of physical objects in the virtual model to be rendered as well. The client device may modify a video feed to include the rendered 3D representations, as described above, or may only display the rendered 3D representations and the virtual objects.

While the description above may primarily describe a game server that stores a modified virtual model from a content developer system and provides that modified virtual model to a client device, in some embodiments, the content developer system directly delivers the modified virtual model to the client device without going through the game server. For example, after generating the modified virtual model, the content developer system may transmit the modified virtual model to the client device for storage.

Figure 6:
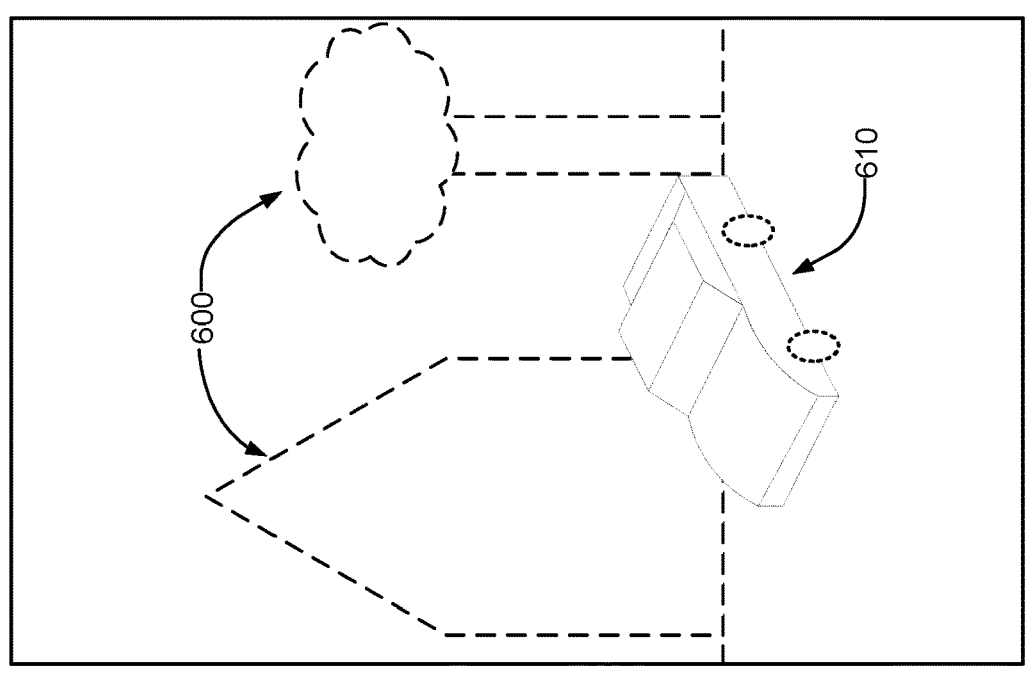
FIG. 6 illustrates customized virtual content included in a virtual model, according to one embodiment.

FIG. 6 illustrates customized virtual content 610 included in a virtual model, in accordance with some embodiments. The virtual model includes 3D representations 600 of physical objects within the physical space. In the illustrated example, the virtual model includes 3D representations 600 of a building and a tree. The virtual content 610 in FIG. is a virtual car that a content developer system added to the virtual model. As noted above, the 3D representations 600 and the virtual content 610 is localized within the virtual model relative to an origin point of the virtual model.

Figure 7:
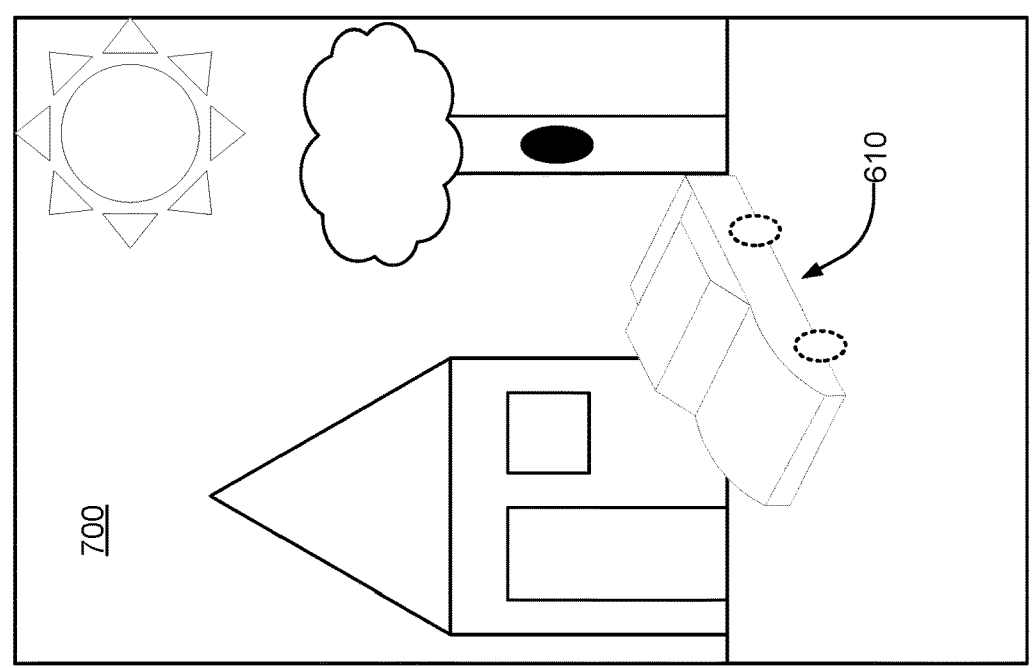
FIG. 7 illustrates how the virtual content of FIG. 6 may be used to modify a video feed, according to one embodiment.

FIG. 7 illustrates how the virtual content of FIG. 6 may be used to modify a video feed, in accordance with some embodiments. The original video feed 700 depicts the physical space that corresponds to the virtual model. For example, the video feed 700 depicts the physical objects whose 3D representations 600 were illustrated in FIG. 6. A client device modifies the video feed to include the virtual content 610. However, as the physical objects are depicted in the video feed 700, the client device does not render the 3D virtual representations of the physical objects.

ADDITIONAL CONSIDERATIONS

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing the described functionality. Thus, while particular embodiments and applications have been illustrated and described, it is to be understood that the described subject matter is not limited to the precise construction and components disclosed. The scope of protection should be limited only by the following claims.

What is claimed is:

1. A computer-implemented method comprising:
   receiving, at an online system from a third-party system, a request for a virtual model of a physical space, wherein the virtual model comprises:
   an origin point; and
   a three-dimensional representation of a physical object within the physical space, wherein the three-dimensional representation is located within the virtual model relative to the origin point;

transmitting, by the online system, the virtual model to the third-party system;
   receiving, at the online system from the third-party system, a modified virtual model, wherein the modified virtual model comprises a virtual object added to the virtual model by the third-party system, wherein the virtual object is located within the virtual model relative to the origin point;
   transmitting, by the online system, the modified virtual model to a client device;
   receiving, at the client device from the online system, the modified virtual model;
   obtaining pose data of the client device, wherein the pose data comprises sensor data describing a pose of the client device;
   obtaining a video feed captured by a camera of the client device;
   identifying a physical pose of the client device within the physical space based on the pose data and the video feed;
   identifying a virtual pose within the modified virtual model of the client device corresponding to the physical pose, wherein the virtual pose is identified relative to the origin point of the modified virtual model;
   modifying the video feed to include the virtual object provided by the third-party system based on the virtual pose and the modified virtual model; and
   causing the modified video feed to be displayed by the client device.

2. The method of claim 1, wherein the origin point is a six-dimensional point that provides a reference location and orientation for the modified virtual model.

3. The method of claim 1, wherein the three-dimensional representation comprises a mesh of polygons.

4. The method of claim 1, wherein the modified virtual model further comprises animation instructions for the virtual object, and wherein displaying the modified video feed comprises:
   displaying the virtual object in accordance with the animation instructions.

5. The method of claim 1, wherein the pose data comprises sensor data describing the physical space.

6. The method of claim 5, wherein the pose data comprises sensor data describing the physical object within physical space.

7. The method of claim 6, wherein identifying the virtual pose of the client device comprises:
   mapping the three-dimensional representation of the physical object onto the sensor data describing the physical object.

8. The method of claim 1, wherein identifying the virtual pose of the client device comprises:
   mapping the origin point of the modified virtual model to a physical pose in the physical space.

9. The method of claim 1, wherein modifying the video feed comprises:
   modifying the video feed to include the virtual object without modifying the video feed to include the three-dimensional representation of the physical object.

10. The method of claim 1, wherein modifying the video feed comprises:
   modifying the video feed to include the three-dimensional representation of the physical object.

11. A non-transitory computer-readable medium storing instructions that, when executed by a processor, cause the processor to perform operations comprising:

receiving, at an online system from a third-party system, a request for a virtual model of a physical space, wherein the virtual model comprises:

an origin point; and a three-dimensional representation of a physical object within the physical space, wherein the three-dimensional representation is located within the virtual model relative to the origin point;

transmitting, by the online system, the virtual model to the third-party system;

receiving, at the online system from the third-party system, a modified virtual model, wherein the modified virtual model comprises a virtual object added to the virtual model by the third-party system, wherein the virtual object is located within the virtual model relative to the origin point;

transmitting, by the online system, the modified virtual model to a client device;

receiving, at the client device from the online system, the modified virtual model;

obtaining pose data of the client device, wherein the pose data comprises sensor data describing a pose of the client device;

obtaining a video feed captured by a camera of the client device;

identifying a physical pose of the client device within the physical space based on the pose data and the video feed;

identifying a virtual pose within the modified virtual model of the client device corresponding to the physical pose, wherein the virtual pose is identified relative to the origin point of the modified virtual model;

modifying the video feed to include the virtual object provided by the third-party system based on the virtual pose and the modified virtual model; and causing the modified video feed to be displayed by the client device.

12. The computer-readable medium of claim 11, wherein the origin point is a six-dimensional point that provides a reference location and orientation for the modified virtual model.

13. The computer-readable medium of claim 11, wherein the three-dimensional representation comprises a mesh of polygons.

14. The computer-readable medium of claim 11, wherein the modified virtual model further comprises animation instructions for the virtual object, and wherein displaying the modified video feed comprises:

displaying the virtual object in accordance with the animation instructions.

15. The computer-readable medium of claim 11, wherein the pose data comprises sensor data describing the physical space.

16. The computer-readable medium of claim 15, wherein the pose data comprises sensor data describing the physical object within the physical space.

17. The computer-readable medium of claim 16, wherein identifying the virtual pose of the client device comprises:

mapping the three-dimensional representation of the physical object onto the sensor data describing the physical object.

18. The computer-readable medium of claim 11, wherein identifying the virtual pose of the client device comprises:

mapping the origin point of the modified virtual model to a physical pose in the physical space.

19. The computer-readable medium of claim 11, wherein modifying the video feed comprises:

modifying the video feed to include the virtual object without modifying the video feed to include the three-dimensional representation of the physical object.

20. The computer-readable medium of claim 11, wherein modifying the video feed comprises:

modifying the video feed to include the three-dimensional representation of the physical object.

* * * * *